(12) United States Patent
Lohrberg et al.

(10) Patent No.: US 9,840,415 B2
(45) Date of Patent: Dec. 12, 2017

(54) PROCESS AND PLANT FOR SEPARATING HEAVY METALS FROM PHOSPHORIC STARTING MATERIAL

(71) Applicant: Outotec (Finland) Oy, Espoo (FI)

(72) Inventors: Dirk Lohrberg, Offenbach (DE);
Bertold Stegemann, Eschborn (DE);
Guenter Schneider, Lorsch (DE);
Ludwig Hermann, Auersthal (AT)

(73) Assignee: OUTOTEC (FINLAND) OY, Espoo (FI)

(*) Notice: Subject to any disclaimer, the term of this patent is extended or adjusted under 35 U.S.C. 154(b) by 189 days.

(21) Appl. No.: 14/409,487

(22) PCT Filed: Jun. 21, 2013

(86) PCT No.: PCT/EP2013/063052
§ 371 (c)(1),
(2) Date: Dec. 19, 2014

(87) PCT Pub. No.: WO2013/190116
PCT Pub. Date: Dec. 27, 2013

(65) Prior Publication Data
US 2015/0175423 A1 Jun. 25, 2015

(30) Foreign Application Priority Data
Jun. 21, 2012 (WO) ............... PCT/EP2012/061986

(51) Int. Cl.
| | | |
|---|---|---|
| *C01B 25/00* | (2006.01) | |
| *C01B 25/04* | (2006.01) | |
| *C05B 7/00* | (2006.01) | |
| *B01J 8/18* | (2006.01) | |
| *B01J 8/24* | (2006.01) | |
| *C02F 11/00* | (2006.01) | |
| *C02F 11/10* | (2006.01) | |
| *C02F 101/20* | (2006.01) | |

(52) U.S. Cl.
CPC ............. *C01B 25/04* (2013.01); *B01J 8/1836* (2013.01); *B01J 8/24* (2013.01); *C05B 7/00* (2013.01); *B01J 2208/00017* (2013.01); *C02F 11/004* (2013.01); *C02F 11/10* (2013.01); *C02F 2101/20* (2013.01); *Y02P 20/129* (2015.11)

(58) Field of Classification Search
CPC ...................................................... C01B 25/04
USPC ........ 423/1, 322, 316, 317, 321.1; 71/32–53
See application file for complete search history.

(56) References Cited

U.S. PATENT DOCUMENTS

| | | | | |
|---|---|---|---|---|
| 4,158,558 | A | * | 6/1979 | Thompson .............. C05B 13/06 71/34 |
| 4,378,340 | A | * | 3/1983 | Berglund .............. C01B 25/238 423/101 |
| 4,479,924 | A | * | 10/1984 | von Plessen .......... C01B 25/238 423/100 |
| 2009/0183543 | A1 | | 7/2009 | Boutoussov |
| 2012/0070360 | A1 | * | 3/2012 | Wissemborski ... B01D 11/0203 423/304 |

FOREIGN PATENT DOCUMENTS

| | | |
|---|---|---|
| CN | 101210281 A | 7/2008 |
| CN | 101234921 A | 8/2008 |
| CN | 102277485 A | 12/2011 |
| DE | 10243840 A1 | 3/2004 |
| DE | 102004059935 A1 | 6/2006 |
| JP | 09194240 A | 7/1997 |
| JP | 2006003013 A | 1/2006 |
| JP | 2006095463 A | 4/2006 |
| WO | WO 2007124527 A1 | 11/2007 |

OTHER PUBLICATIONS

Translation of JP 2006-003013, May 2006.*
Mansheng Chu, "Raw Material Fuels and Auxiliary Materials for Metallurgy of Iron and Steel", Metallurgy Industry Press, 1st edition, Dec. 2010.
Chinese Office Action, State Intellectual Property Office of the People's Republic of China, Application No. 201380032444.7, dated Aug. 25, 2015, pp. 1-9.

* cited by examiner

*Primary Examiner* — Steven Bos
(74) *Attorney, Agent, or Firm* — Leydig, Voit & Mayer, Ltd.

(57) ABSTRACT

A process for separating heavy metals from a phosphoric starting material includes, in a step (i), heating the starting material to a temperature between 700 and 1,100° C. in a first reactor and withdrawing combustion gas. In a step (ii), the heated starting material at the temperature between 700 and 1,100° C. is transferred to a second reactor, chlorides of alkaline and alkaline earth metals are added and process gas is withdrawn.

9 Claims, 1 Drawing Sheet

PROCESS AND PLANT FOR SEPARATING HEAVY METALS FROM PHOSPHORIC STARTING MATERIAL

CROSS-REFERENCE TO PRIOR APPLICATIONS

This application is a U.S. National Stage Application under 35 U.S.C. §371 of International Application No. PCT/EP2013/063052 filed on Jun. 21, 2013 and claims benefit to International Patent Application No. PCT/EP2012/061986 filed on Jun. 21, 2012. The International Application No. PCT/EP2013/063052 was published in English on Dec. 27, 2013 as WO 2013/190116 A1 under PCT Article 21(2).

FIELD

The present invention is directed to a process and a plant for separating heavy metals from phosphoric starting material.

BACKGROUND

Phosphate is a very important nutrient for the photosynthesis of plants so that more than 90% of the global production of phosphate is processed to phosphorus fertilizers. The availability of phosphorus, however, is limited. In order to enhance the limited availability of phosphoric material there have been efforts to use sewage sludge, which often contains a considerable amount of phosphorus and which usually is disposed of in a landfill, as a source to recover phosphorus. It has been proposed to burn phosphorus containing sewage sludge to obtain a phosphorus containing ash with a phosphorus content of 8 to 20 wt.-%. The main chemical components of the resulting sewage sludge ashes are $SiO_2$, $CaO$, $Al_2O_3$, $Fe_2O_3$ and $P_2O_5$. The ashes, however, also contain heavy metals, such as lead, cadmium, chrome, copper, nickel, zinc or mercury. As the content of these elements exceed the limits provided by official regulations, the sewage sludge ash as such cannot be used as fertilizer and has to be processed beforehand.

Document DE 10 2004 059 935 A1 describes a process for the separation of heavy metals from phosphorus-containing sewage sludge ash, wherein the phosphoric ash is heated to a temperature above the boiling point of the oxychlorides or chlorides of the heavy metals to be removed and wherein the heated sewage sludge ash is contacted with an oxygen-lean atmosphere containing chlorine gas. Thereby chlorides and oxychlorides of the heavy metals are formed and evaporated so that they can be separated from the ash. The process has the disadvantage that the hot combustion gases and the gaseous reaction products form highly corrosive gas mixture with the chlorine gas so that there presently is no technology for recovering the heat or keeping the gas stream in a closed loop at temperatures above 850° C. Without heat recovery, the whole volume of combustion air and chlorine gas must be heated from ambient temperature to a temperature above the boiling points of the chlorides and cooled after the reactor by direct supply of fresh air or water. Subsequently, the excess chlorine gas must be removed from the flue gas and disposed of at high costs. New chlorine gas must be produced and supplied by an energy intensive process. As excess chlorine must be provided to ensure a sufficient removal of the heavy metals, the process gas volume is increased considerably.

SUMMARY

In an embodiment, the present invention provides a process for separating heavy metals from a phosphoric starting material. In a step (i), the starting material is heated to a temperature between 700 and 1,100° C. in a first reactor and combustion gas is withdrawn. In a step (ii), the heated starting material at the temperature between 700 and 1,100° C. is transferred to a second reactor, chlorides of alkaline and alkaline earth metals are added and process gas is withdrawn.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
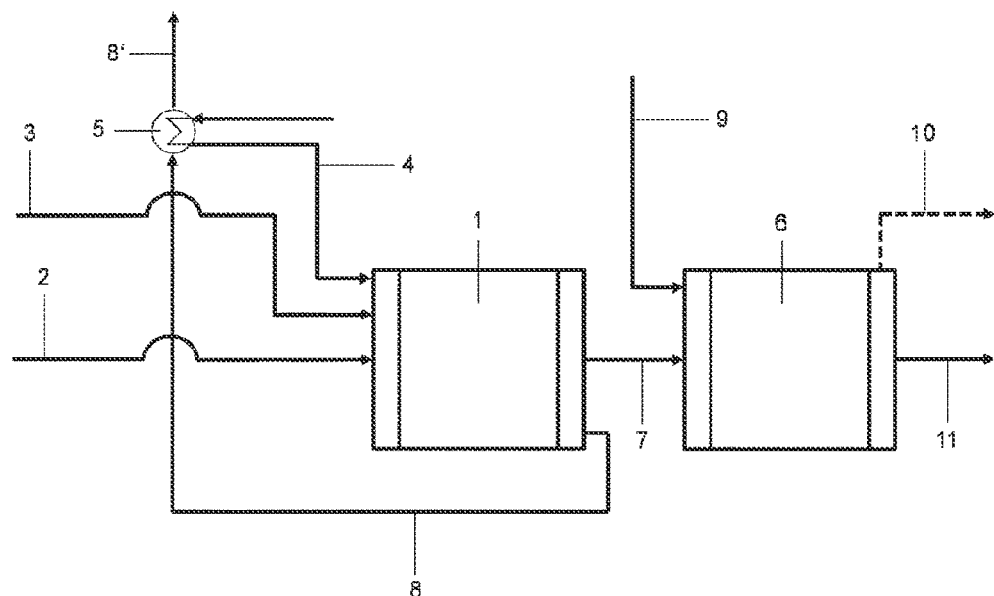
FIG. 1 is a simplified block diagram of a plant implementing the process of the present invention according to a first embodiment.

In an embodiment, the present invention provides for a reliable separation of heavy metals from phosphoric material in a more energy efficient way.

In the reactor, a high concentration of reactive gases shall be achieved while the dilution of reaction gases by combustion gases shall be avoided to provide favorable reaction conditions and minimize the amount of chlorine to be added to the process and the process gas volume.

An embodiment of the present invention provides a process comprising the following steps:
  i) Heating the starting material to a temperature between 700 and 1,100° C., in a first reactor and withdrawing combustion gas, and
  ii) Transferring the heated starting material to a second reactor, adding chlorides of alkaline and alkaline earth metals and withdrawing process gas.

Preferably, the temperature of the heated starting material in the second reactor is between 700 and 1,100° C.

Rather than adding chlorine gas as it is the case in the prior art, an embodiment of the present invention provides for the addition of salts, in particular chlorides of alkaline and alkaline earth metals, as a source to provide the chlorine for the reaction with the heavy metals. Preferred salts include chlorides of sodium, potassium, and in particular magnesium or calcium or combinations thereof. Due to the high temperature in the second reactor the salts decompose into their elemental substances and release gaseous chlorine that reacts with the toxic heavy metals. Thereupon, the heavy metals in their chlorinated form evaporate and leave the reactor with the process gas. The remaining, phosphorus rich solids leave the reactor and are conveyed to a finishing section to manufacture straight phosphorus or complex fertilizer. The supply of the necessary chlorine to the second reactor in the form of salts rather than excess chlorine gas is possible because there is no dilution of the process gas by combustion air. The starting material is pre-heated in a separate first reactor and the combustion gases are withdrawn, e.g. in a cyclone, so that only the ash is transferred to the second reactor. Preheating the ash prior to introducing it into the second reactor reduces the amount of combustion air to be supplied to the second reactor.

The technology is based on the fact that most metals take their gaseous shape at lower temperatures in chlorine compounds compared to their elemental state or to oxidic compounds as prevailing in ashes. In the thermo-chemical process, the solid mineral salts admixed with the ash decompose at a temperature of about 1,000° C. into their elemental substances and react with the partly toxic heavy metal compounds to gaseous chlorinated compounds that evaporate from the reactor bed.

The process gas from the second reactor contains, besides the heavy metal chlorides, excess volume of chlorine that did not react with the heavy metal compounds and should be returned to the process. To this end, in a first step, the process gas is quenched after withdrawal from the second reactor with, e.g., fresh air to condensate the heavy metal compounds to solid particles. As the feed of chlorine can be adapted to the actually needed amount, the chlorine content of the off gas can be substantially reduced. Ideally, there is a stoichiometric conversion so that there is a minimal excess of chlorine only.

Preferably, the solid particles are captured in a baghouse filter as filter dust. The filter dust will be deposited as secondary waste or can be recycled to the first reactor in step i).

The chlorinated heavy metals remaining in the gaseous state stream through the filter and according to a preferred embodiment of the invention are reacted with magnesite in particular in a system of two sequentially installed mixing reactors and baghouse filters. At this point, the reactor process is reversed and a solid, dry salt is formed. The salt is preferably recycled to the second reactor. Fresh salts compensate for the chlorines that have participated in the chemical reactions.

The first reactor in step i) may be heated by internal combustion based on supply air and fuel and/or combustion gases withdrawn from the first reactor and recycled for preheating the starting material, the fuel and/or the air.

To remove undesired contaminants, the outlet gas from an optional pre-heater, the combustion gas of the first reactor and/or the process gas withdrawn from the second reactor are separately or in combination passed through at least one cleaning stage.

The phosphorus rich solids withdrawn from the second reactor in step ii) may be mixed with a high grade straight phosphorus carrier and/or a nutrition carrier to obtain highly valuable phosphate fertilizer. The solids may be homogenized and granulated to facilitate the further handling.

In a preferred embodiment of the invention, sodium carbonate may be supplied to the second reactor in step ii). The sodium carbonate may replace a part, such as 20 to 50% of the salts added to the second reactor and increase the solubility within the reactor and/or the product.

In a further embodiment of the invention, carbonaceous solids, such as coal or coke, are supplied to the second reactor to provide for a reducing atmosphere.

The present invention is also directed, in an embodiment, to a plant for separating heavy metals from phosphoric material suitable for performing the above described process. The plant comprises a first reactor for heating the material, a separator for separating the solids from the combustion gas having at least one line for withdrawing combustion gas, and a second reactor for mixing the heated material with chlorides of alkaline and alkaline earth metals and having at least one line for withdrawing process gas.

In addition, a pre-heater for the material and/or for air fed to the first reactor may be provided.

Preferably, the pre-heater for the material is a venturi, the first reactor preferably is a circulating fluidized bed reactor, and the second reactor preferably is a rotary reactor for efficiently mixing the heated phosphoric material with the salts.

Downstream from the reactor, preferably a baghouse filter for cleaning the combustion and/or process gases is provided.

In the plant shown in FIG. 1, a raw or starting material such as sewage sludge ash is pneumatically conveyed from storage silos to a first reactor (heater) 1 through line 2. In the first reactor 1, preferably a circulating fluidized bed heater, the starting material is pre-heated by hot combustion gases resulting from the combustion of fuel, such as natural gas, supplied through fuel line 3 with air supplied through air line 4. The air may be preheated in air preheater 5. In the first reactor 1 the ash is heated to 700 to 1,100° C., more preferably 1,000 to 1,100° C. and in particular to about 1,050° C.

The heated ash leaves the first reactor 1 with the off-gas stream and is separated therefrom in a separation device, such as a hot-gas cyclone, and fed to a second reactor 6. The combustion gases are withdrawn from the cyclone through line 8 and may be used to preheat the air in preheater 5. Thereafter, the combustion gases are cleaned in a filter device, such as a baghouse filter.

The ash supplied through line 7 carries the heat to the second reactor 6, preferably a rotary reactor. Simultaneously with the ash, salt, in particular chlorides of alkaline and alkaline earth metals, such as sodium, potassium, magnesium or calcium or combinations thereof, is fed to the second reactor 6 below the ash through a feeding chute 9. The salts are mixed by rotation with the ash in the reactor bed whereby the salts decompose into their elemental substances and release gaseous chlorine that reacts with the toxic heavy metals contained in the ash. The heavy metals evaporate and leave the reactor 6 with the process gas through line 10. The remaining, phosphorus rich solids leave the reactor 6 through a gas-tight outlet and product line 11 and are cooled. The second reactor 6 may be equipped with a burner to compensate for the heat loss because of radiation and chemical reactions. Preferably, the material in the second reactor 6 is kept below the melting temperature of the ash used in the process. Depending on the specific ash used, this melting temperature usually is between 900 and 1,100° C. As this heat loss is rather low, a small natural gas/oxygen burner should be sufficient for this purpose.

The semi-product withdrawn through product line 11 is free from toxic heavy metals and conveyed to a finishing section where it is manufactured to straight phosphorus or complex fertilizers.

The combustion gas from the first reactor is purified in a baghouse filter and the filter dust is fed back to the first reactor 1 or deposited as secondary waste.

The process gas from the second reactor 6 contains, besides the heavy metal chlorides, excess volume of chlorine that did not react with the heavy metal compounds and should be returned to the process.

In a first step, the process gas is quenched to about 200° C. with fresh air to condensate the heavy metal compounds to solid particles. These particles are captured in a baghouse filter as filter dust. Until heavy metal recycling will be commercially viable, the filter dust will be deposited as secondary waste. Chlorinated heavy metals remaining in the gaseous state stream through the filter and react with magnesite in a system of preferably two sequentially installed mixing reactors and baghouse filters. At this point, the reactor process is reversed and a solid, dry salt is formed. This salt may be recycled to the second reactor. Fresh salts compensate for the chlorine that has participated in the chemical reactions. Finally, the purified process gas and the purified combustion gas are united and submit to a last purification step to remove remaining traces of substances that must not be released to the air. The filter dust from the last purification step, predominantly sulfurous components, is admixed to the fertilizer as a secondary nutrient.

At the point of leaving the thermo-chemical process, the semi-product already complies with the requirements of the fertilizer act. The concentration of toxic substances and particularly of cadmium and uranium is one to two orders of magnitude below the respective concentrations in phosphate rock based fertilizers.

To comply with the tolerances required by the fertilizer acts +/−0.8 percentage points (total $P_2O_5$) of a high grade straight phosphorus (P) carrier is added to the semi-product. For this purpose, the semi-product is analyzed online for its concentration of $P_2O_5$ and one or several guiding heavy metals. Depending on the desired phosphate concentration in the final product, a measured quantity of triple-superphosphate (TSP) or phosphoric acid is admixed and homogenized. For the production of a phosphate fertilizer for organic farming, phosphate rock is used instead of TSP to adjust the P-concentration.

As a first option the product is homogenized and granulated in a mixer-granulator and—depending on the final purpose—finished as dust free powder or as final granules. From this stage, the product has become the final product of the plant that either will be sold to the agricultural product distributors or to fertilizer manufacturers.

As a second option, the plant can be extended to manufacture complex fertilizers by admixture of additional nutrient carriers. This step requires additional silos/storing facilities and the corresponding design of the finishing section of the plant to handle the additional nutrient and fertilizer quantities. In this case, the product and additional nutrient carriers are conveyed and fed to the mixer-granulator in ratios determined by the target fertilizer type. By adding small amounts of water and—depending on the requirements—binders and coating agents, complex fertilizer granules of homogenous composition and a determined corn size distribution are produced that comply with all requirements in terms of threshold values, tolerances and nutrient solubility.

Figure 2:
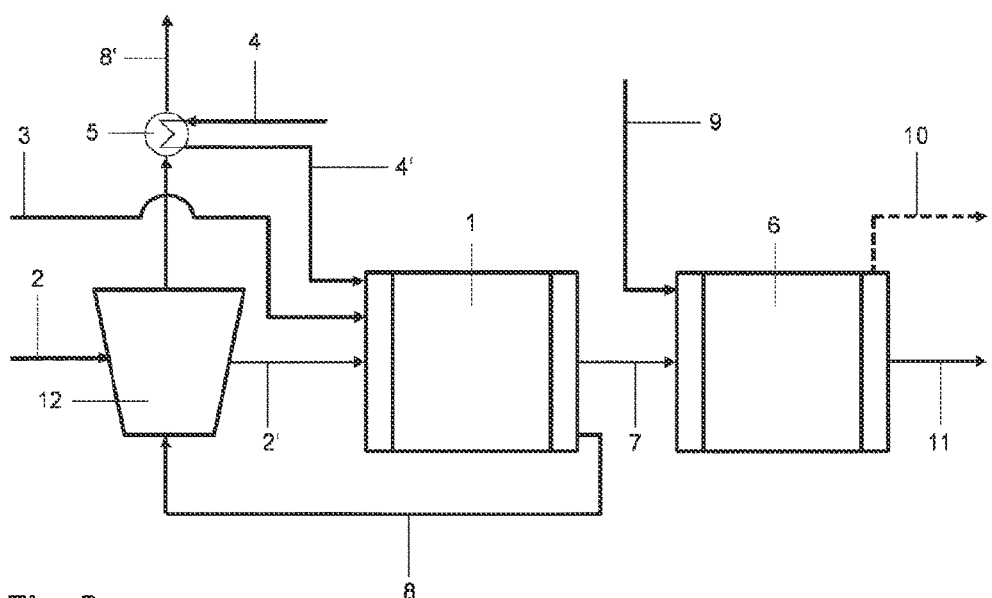
FIG. 2 is a simplified block diagram of a plant implementing the process of the present invention according to a second embodiment.

In the second embodiment shown in FIG. 2, the raw material (ash) is conveyed from the storage silos through line 2 to a pre-heater 12, such as a venturi, where it is pre-heated by hot combustion gases supplied through line 8. Ash particles and gas are separated in a separation device, such as a cyclone, from where ash is fed to the first reactor 1. In all other aspects this embodiment corresponds to the first embodiment according to FIG. 1 so that the same plant components are designated by the same reference numerals. Reference is made to the above description.

The raw material, ash, does not contain any combustible and halogenic-organic substances. It mainly consists of phosphate, calcium, silicon, iron and aluminum compounds. With the present invention, heavy metals are removed by using natural salts.

The ash treatment capacity of the plant may be e.g. 4 tons per hour. Raw materials are heated by natural gas burners and energy is efficiently recycled within the plant. Process emissions are effectively controlled by a sequence of adsorption reactors and baghouse filters. The heavy metals are captured as dry filter dust and safely disposed of in a landfill. The excess chlorine is quantitatively recycled and reused in the process.

Application of the product as a phosphate fertilizer is more environment friendly than using either conventional mineral fertilizers or recycled organic fertilizers. In comparison to conventional mineral fertilizers, concentrations of cadmium and uranium are 1-2 orders of magnitude lower. In comparison to organic fertilizers, no risk of transfer of organic pollutants to the food and feed chain exists.

Additional nutrient carriers are exclusively licensed fertilizers as ammonium sulfate, potassium chloride (MOP), potassium sulfate (SOP) and converter slag. Triple-superphosphate and the finished products will be stored in silos or as bulk material in covered warehouses. Binders and coating agents and—on demand—phosphorus and sulfuric acid are stored in compliance with legal requirements.

LIST OF REFERENCE NUMERALS

1 first reactor (heater)
2, 2' line
3 fuel line
4 air line
5 air pre-heater
6 second reactor
7 line
8, 8' line
9 feeding chute
10 line
11 product line
12 pre-heater

The invention claimed is:
1. A process for separating heavy metals from a phosphoric starting material, the process comprising:
   (i) heating the starting material by combustion of fuel with air to a temperature between 700 and 1,100° C. in a first reactor and withdrawing combustion gas;
   (ii) transferring the heated starting material at the temperature between 700 and 1,100° C. to a second reactor, adding chlorides of alkaline and alkaline earth metals to the heated starting material and withdrawing process gas so as to obtain a semi-product; and
   (iii) admixing and homogenizing a measured quantity of triple-superphosphate, phosphate rock or phosphoric acid to the semi-product so as to obtain a final product having a phosphate concentration.

2. The process according to claim 1, further comprising quenching the process gas after withdrawal from the second reactor.

3. The process according to claim 1, further comprising filtering the process gas or reacting the process gas with magnesite so as to form a solid salt.

4. The process according to claim 3, wherein the solid salt is recycled to step (ii).

5. The process according to claim 1, wherein the air and the fuel are supplied to the first reactor in step (i).

6. The process according to claim 5, further comprising preheating at least one of the starting material, the fuel and the air using the combustion gas withdrawn from the first reactor and recycled for the preheating.

7. The process according to claim 6, wherein at least one of outlet gas from the preheating, the combustion gas and the process gas are separately or in combination passed through at least one cleaning stage.

8. The process according to claim 1, further comprising mixing the final product with a nutrient carrier and granulating the final product.

9. The process according to claim 1, wherein the starting material in step (i) is sewage sludge ash.

* * * * *